(12) United States Patent
Bunting et al.

(10) Patent No.: US 6,393,289 B1
(45) Date of Patent: May 21, 2002

(54) APPARATUS, METHOD AND SYSTEM FOR WIRELESS TELECOMMUNICATION SESSION CONTROL BY AN ADJUNCT NETWORK ENTITY

(75) Inventors: Roger L. Bunting, Naperville; Jason Byrne, Lisle; Robert Thomas Calabrese, Naperville; Harold Robert Smith, Jr., Oakbrook Terrace, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/196,484

(22) Filed: Nov. 19, 1998

(51) Int. Cl.[7] .................................................. H04Q 7/20
(52) U.S. Cl. ........................ 455/445; 455/418; 455/461
(58) Field of Search .................................. 455/445, 417, 455/420, 426, 461, 466; 379/201, 221

(56) References Cited

U.S. PATENT DOCUMENTS

| 5,377,186 A | * | 12/1994 | Wegner et al. ............... 379/201 |
| 5,572,583 A | * | 11/1996 | Wheeler, Jr. et al. ....... 379/207 |
| 5,884,179 A | * | 3/1999 | Patel ............................ 455/445 |
| 5,991,621 A | * | 11/1999 | Alperovich .................. 455/433 |
| 6,006,094 A | * | 12/1999 | Lee .............................. 455/445 |
| 6,055,239 A | * | 4/2000 | Kato ............................ 370/409 |
| 6,061,566 A | * | 5/2000 | Friman ........................ 455/445 |
| 6,070,054 A | * | 5/2000 | Foladare et al. ............ 455/31.3 |
| 6,070,080 A | * | 5/2000 | Madour et al. .............. 455/458 |
| 6,075,855 A | * | 6/2000 | Christiansen et al. ....... 379/221 |
| 6,097,962 A | * | 8/2000 | Corriveau et al. ........... 455/466 |
| 6,115,461 A | * | 9/2000 | Baiyor et al. ................ 379/211 |
| 6,122,357 A | * | 9/2000 | Farris et al. ................. 379/207 |

* cited by examiner

Primary Examiner—Vivian Chang
Assistant Examiner—Duc Nguyen
(74) Attorney, Agent, or Firm—Nancy R. Gamburd

(57) ABSTRACT

An apparatus, method and system are provided which, for a wireless telecommunication session handled by a mobile switching center, allow an adjunct network entity, such as an intelligent peripheral, a service node, a service control point, or another switching center, to maintain control over the telecommunication session and, in the preferred embodiment, provide intelligent network services. Such control is provided without the adjunct network entity monitoring or maintaining a direct connection the telecommunication session, such as a voice path or other circuit-based connection. In the various embodiments, the adjunct network entity maintains such control through the transmission of a control message to the mobile switching center, in which the control message includes various directives to the mobile switching center, such as a redirection directive, directing the switching center to route or reroute a call leg to specified digits; an announcement directive, directing the switching center to play a specified announcement during the telecommunication session; or an action directive, directing the switching center to perform a specified action such as releasing the telecommunication session.

52 Claims, 5 Drawing Sheets

APPARATUS, METHOD AND SYSTEM FOR WIRELESS TELECOMMUNICATION SESSION CONTROL BY AN ADJUNCT NETWORK ENTITY

FIELD OF THE INVENTION

The present invention relates in general to wireless telecommunication systems, and more particularly, to an apparatus, method and system for wireless telecommunication session or call control by an adjunct network entity.

BACKGROUND OF THE INVENTION

With the advent of increasingly sophisticated telecommunication services, intelligent network functionality is increasingly distributed throughout a telecommunication network. Such distributed network functionality typically resides in a network of servers, switches, databases, and other devices, which are referred to herein as adjunct network entities. For example, in the telecommunication networks provided by Lucent Technologies, Inc., such advanced telecommunication features such as voice activated dialing, prepaid calling cards, single number reach, and password and personal identification number ("PIN") verification, are provided between and among a group of adjunct network entities and other networked devices referred to as service control points, intelligent peripherals, and service nodes, in addition to various switching centers, such as mobile switching centers.

A particular difficulty raised by the provision of such sophisticated telecommunication services relates to call routing. In the prior art, to provide such sophisticated telecommunication services, a telecommunication session is routed or trunked directly to an adjunct network entity such as a service control point or service node, followed by rerouting or retrunking the call back to the switch, for subsequent completion of the call to its desired destination. This loop or "hairpin" connection configuration is highly undesirable, unnecessarily tying up trunks and other network resources. As a consequence, it is highly desirable to eliminate such a loop or hairpin connection in the provision of advanced telecommunication features and services.

One such proposal is included in the ANSI41 specification promulgated by the American National Standards Institute for wireless telecommunication, such as cellular communication, and is referred to as a "redirection directive". The ANSI-41 redirection directive specification, however, does not include any specific directions or guidelines for implementation and control of such redirected telecommunication sessions. In addition, the ANSI-41 specification does not provide for the simultaneous provision of other advanced features during, concomitant with or subsequent to a redirection directive. The ANSI-41 specification also does not provide for continued and subsequent control by an adjunct network entity over the special features of the call without maintaining the hairpin connection. In addition, the ANSI-41 specification does not provide for such control in mobile terminated calls, in addition to mobile originated calls.

As a consequence, a need remains for an apparatus, method and system to implement and maintain wireless telecommunication session or call control by an adjunct network entity, such as by a service control point, a service node, an intelligent peripheral, or an additional mobile switch. Such an apparatus, method and system should also provide for maintaining such current and subsequent control without also maintaining a direct connection, such as a loop or hairpin connection. Such an apparatus, method and system should also be user friendly, user transparent, and dynamic and responsive to changing environmental and user conditions which may arise in wireless communication systems.

SUMMARY OF THE INVENTION

The apparatus, method and system of the present invention provide for ongoing control of a wireless telecommunication session by an adjunct network entity over a wide variety of intelligent network services, utilizing a control message having various directives for current or subsequent execution or implementation by a switching center. Such control may be before or during a communication session. In addition, such activities may be performed during or after routing or rerouting of a call, for example, for rerouting of calls for voice activated dialing services.

In addition, the apparatus, method and system of the present invention implement and maintain telecommunication session or call control by an adjunct network entity, such as by a service control point, a service node, an intelligent peripheral, or an additional mobile switch, without also maintaining an ongoing or direct connection, such as a loop or hairpin connection, with the adjunct network entity. As a consequence, the apparatus, method and system of the present invention provide for a much more efficient use of network resources.

A preferred system embodiment for telecommunication session control by an adjunct network entity, includes an adjunct network entity and a mobile switching center coupled to the adjunct network entity. The adjunct network entity, when operative, includes program instructions to generate a control message in response to a request for an adjunct network service, such as in response to a request for an intelligent network service. The mobile switching center, when operative, includes program instructions to receive an incoming call leg indicating an adjunct network service, to establish a connection with the adjunct network entity and request the adjunct network service from the adjunct network entity. Such a connection may be a voice path connection for certain services, such as speech recognition or voice activated dialing, or may be a packet-based connection for other services, such as for prepaid calling cards. The mobile switching center includes further program instructions to receive the control message from the adjunct network entity and to release the connection with the adjunct network entity. The control message may contain various directives, such as performance directives (to perform various actions or play announcements) and redirection directives (for call routing or rerouting). When the control message includes a redirection directive, the switching center includes further program instructions to route the incoming call leg to designated digits of the control message; and when the control message includes a performance directive, the switching center includes further program instructions to perform the activity designated in the control message.

For example, when the control message includes an action directive (as a type of performance directive), the switching center includes further program instructions to perform the action designated in the control message, such as a release of the telecommunication session or a continuation of processing of the telecommunication session. Also for example, when the control message includes an announcement directive (as a type of performance directive), the switching center includes further program instructions to provide an announcement designated in the control message, such as a mid-call announcement.

In the various embodiments, the adjunct network entity may be a service node, a service control point, an intelligent peripheral, a serving mobile switching center, or any other wireless switching center. Also in the various embodiments, the switching center may be an originating mobile switching center or a terminating mobile switching center.

Also in the various embodiments, the various types of control are independent, and may be implemented or executed independently of each other. For example, in the preferred embodiment, the various directives are independent of each other, and each may be included independently of the others within a control message. For example, the activity which is to be performed may also be independent of the routing of the incoming call leg to designated digits of a control message. Also for example, an activity such as the playing of a mid-call announcement may be independent of any routing or re-routing of the call.

Numerous other advantages and features of the present invention will become readily apparent from the following detailed description of the invention and the embodiments thereof, from the claims and from the accompanying drawings.

DETAILED DESCRIPTION OF THE INVENTION

Figure 1A:
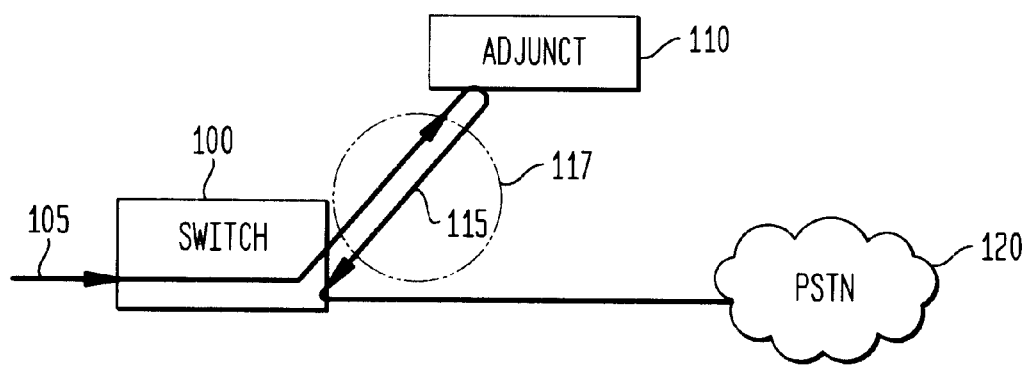
FIG. 1A is a block diagram illustrating a first network connection through an adjunct network entity in accordance with the prior art.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to implement and maintain wireless telecommunication session or call control by an adjunct network entity, such as by a service control point, a service node, an intelligent peripheral, or an additional mobile switch. In accordance with the present invention, such an apparatus, method and system are provided, which also maintain such current and subsequent control without also maintaining an ongoing or direct connection, such as a loop or hairpin connection, with the adjunct network entity. As a consequence, the apparatus, method and system of the present invention provide for a much more efficient use of network resources.

In addition, the apparatus, method and system of the present invention provide for ongoing control by an adjunct network entity over a wide variety of intelligent network services, utilizing a control message having various directives for current or subsequent execution or implementation by a mobile switching center. Such control may be before or during a communication session. For example, the adjunct network entity may direct the mobile switch to play a mid-call announcement, or may direct the switch to release the call. In addition, such activities may be performed during or after routing or rerouting of a call, for example, for routing of calls of voice activated dialing services. The apparatus, method and system of the present invention are also user friendly, user transparent, and dynamic and responsive to changing environmental and user conditions that may arise in wireless communication systems.

FIG. 1A is a block diagram illustrating a first network connection through an adjunct network entity in accordance with the prior art. As illustrated in FIG. 1A, a switch 100, such as a mobile switching center, receives an incoming call leg 105. Such an incoming call leg 105 invokes an intelligent network service, such as voice activated dialing, prepaid calls, single number reach calls, and password or personal identification number ("PIN") verification. Such intelligent network services are usually managed by an adjunct network entity 110, which may be another mobile switch, a service control point ("SCP"), an intelligent peripheral ("IP"), a service node ("SN"), or another network device. When such an intelligent network service is invoked by the incoming call 105, the switch 100 routes or trunks the incoming call to the adjunct network entity 110, which in turn provides the intelligent service, and routes the call back to the switch 100 for further network routing, such as to the public switched telephone network ("PSTN") 120 or to another telecommunication network. As illustrated in FIG. 1A, this network connection 115 involves a loop or "hairpin" connection 117, in which network resources, including the trunk (or trunk line) utilized to route the call between the switch 100 and the adjunct network entity 110, are used continuously for the duration of the call. As mentioned above, this prior art use of an adjunct network entity 110 is highly inefficient, tying up the trunks connecting the switch 100 to the adjunct network entity 110, and unnecessarily utilizing other network hardware.

Figure 1B:
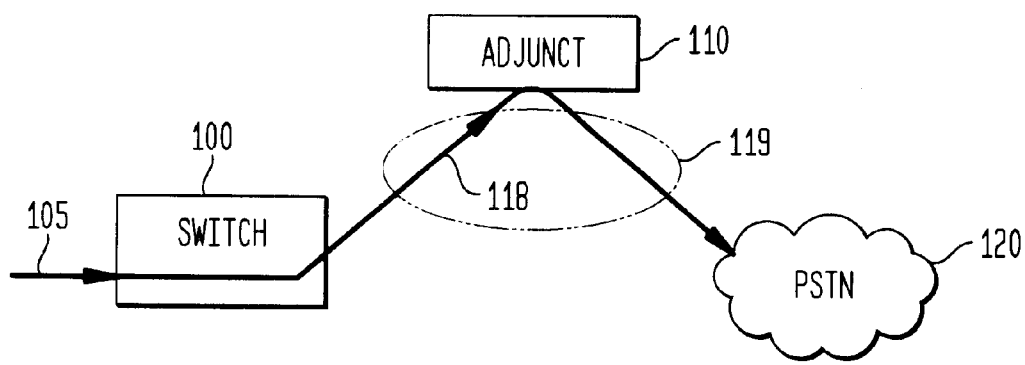
FIG. 1B is a block diagram illustrating a second network connection through an adjunct network entity in accordance with the prior art.

FIG. 1B is a block diagram illustrating a second network connection through an adjunct network entity in accordance with the prior art. As illustrated in FIG. 1A, a switch 100, also such as a mobile switching center, receives an incoming call leg 105. As in FIG. 1A, such an incoming call leg 105 also invokes an intelligent network service that is managed by an adjunct network entity 110. When such an intelligent network service is invoked by the incoming call 105, the switch 100 routes or trunks the incoming call to the adjunct network entity 110, which in turn provides the intelligent service. Rather than routing the call back to the switch 100 for further network routing (FIG. 1A), in FIG. 1B the adjunct network entity 110 directly routes (or reroutes) the call to a network such as to the PSTN 120 or to another telecommunication network. As illustrated in FIG. 1A, this network connection 118 also involves a loop or "hairpin" connection 119, in which network resources, including the trunks utilized to route the call from the switch 100 to the adjunct network entity 110 and from the adjunct network entity 110 to the PSTN 120, are used continuously for the duration of the call. As mentioned above, this prior art use of an adjunct network entity 110 is highly inefficient, tying up these various trunks among the switch, the adjunct network entity 110 and the PSTN 120, and unnecessarily utilizing other network hardware.

Figure 1C:
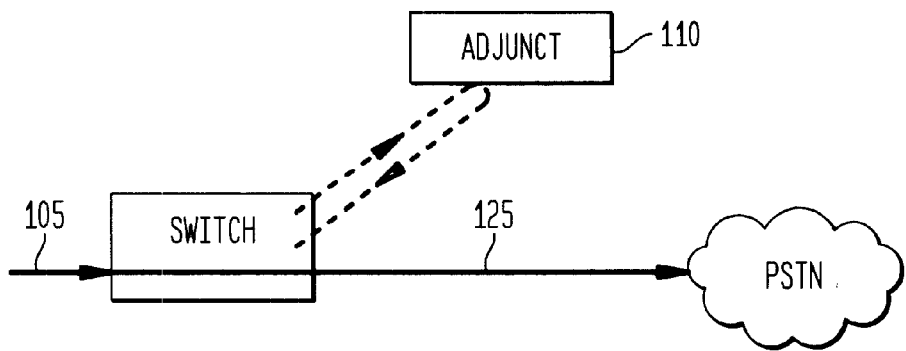
FIG. 1C is a block diagram illustrating a network connection utilizing an adjunct network entity in accordance with the present invention.

FIG. 1C is a block diagram illustrating a network connection utilizing an adjunct network entity 110 in accordance with the present invention. As illustrated in FIG. 1C, a switch 100 also receives an incoming call leg 105. As discussed above with regard to FIGS. 1A and 1B, the incoming call leg 105 indicates or invokes an intelligent network service, such as voice activated dialing, which may be referred to herein as an adjunct service. For example, the incoming call to the switch 100 may contain an origination request directing the switch 100 to query or refer the call to the adjunct network entity 110, or the incoming call may be from a subscriber having a class or type of service also requiring querying or referring the call to the adjunct network entity 110. When one of these features or services is indicated for performance by an adjunct network entity 110, such as voice activated dialing, password verification, PIN verification, or accounting services, in accordance with the present invention the adjunct network entity 110 provides or invokes the service and transmits a control message back to the switch 100 with or having the activity information pertaining to the adjunct service.

In accordance with the present invention, the control message includes activity information, such as performance directives (or other invokes or commands), for current and/or subsequent utilization, execution or implementation by the switch 100, enabling the adjunct network entity 110 to retain control over the telecommunication session, without maintaining or continuing a direct link or connection to the telecommunication session (such as the prior art hairpin connection). For example, the control message may provide a directive to the switch 100 to perform a specified action, such as releasing the call or attaching additional call legs, or to play a specified announcement, or to route the call to specified digits. Such directives may be for current performance, such as current routing, or for subsequent performance, such as playing a mid-call announcement. In the preferred wireless embodiment, the control message transmitted from the adjunct network entity 110 to the switch 100 may have the general format of a redirection directive utilized in ANSI-41, and is utilized both to provide the requested intelligent network service (through a performance directive) and potentially, if desired, to also direct the switch 100 to reroute the call to specific destination digits contained within a redirection directive message.

Other message types, and other messages having different formats, may also be utilized equivalently to the control message of the preferred embodiment. In accordance with the present invention, such a message should provide the requested service and/or call control, as directives for current and/or subsequent execution, without simultaneously requiring that a direct connection be maintained to or through the adjunct network entity, such as a voice path or connection. As illustrated in FIG. 1C, this absence of a direct connection (to and or from the adjunct network entity 110) is illustrated as connection 125, which does not include the loop or hairpin connections 115 or 119 to and/or from the adjunct network entity 110. It is axiomatic, however, that packet-based communication may still be maintained between the adjunct network entity 110 and the switch 100 (which does not involve or require a direct connection such as a voice path).

As mentioned above, in addition to a possible redirection directive, in the preferred embodiment the adjunct network entity 110 may include other network features or services within the control message transmitted back to the switch 100. For example, the adjunct network entity 110 subsequently may direct the switch 100 to play an announcement during the call that has been connected as connection 125, while continuing with the existing call (without a redirection directive). In addition, after a certain period of time, the adjunct network entity 110 may also direct that the call is to be released or disconnected, for example, when the subscriber's prepaid account has been depleted, also without a redirection directive.

Continuing to refer to FIG. 1C, utilizing this control message from the adjunct network entity 110 to the switch 100, the adjunct network entity 110 maintains or retains control over the call (placed as connection 125) and provides intelligent network services, without maintaining an active or direct connection or link to the switch 100. Utilizing this control message from the adjunct network entity 110, the switch 100 removes the loop or hairpin connection of the prior art, thereby also providing a more efficient and effective use of network resources. In addition, other or additional network services and features may be included or embedded within such a control message, such as the playing of an announcement, or the undertaking of some action, such as releasing the call or attaching additional call legs. Other network services or features may also be included within the control message from the adjunct network entity 110.

Another significant feature of the present invention, as described above, is the current and subsequent control maintained over the communication session by the adjunct network entity 110, without ongoing monitoring of the telecommunication session, and without utilization of the loop or hairpin connection of the prior art. Most importantly, the loop or hairpin connection of the prior art is not required, while maintaining and allowing the adjunct network entity 110 to have both current and subsequent control over these network features and services during the telecommunication session.

Figure 2:
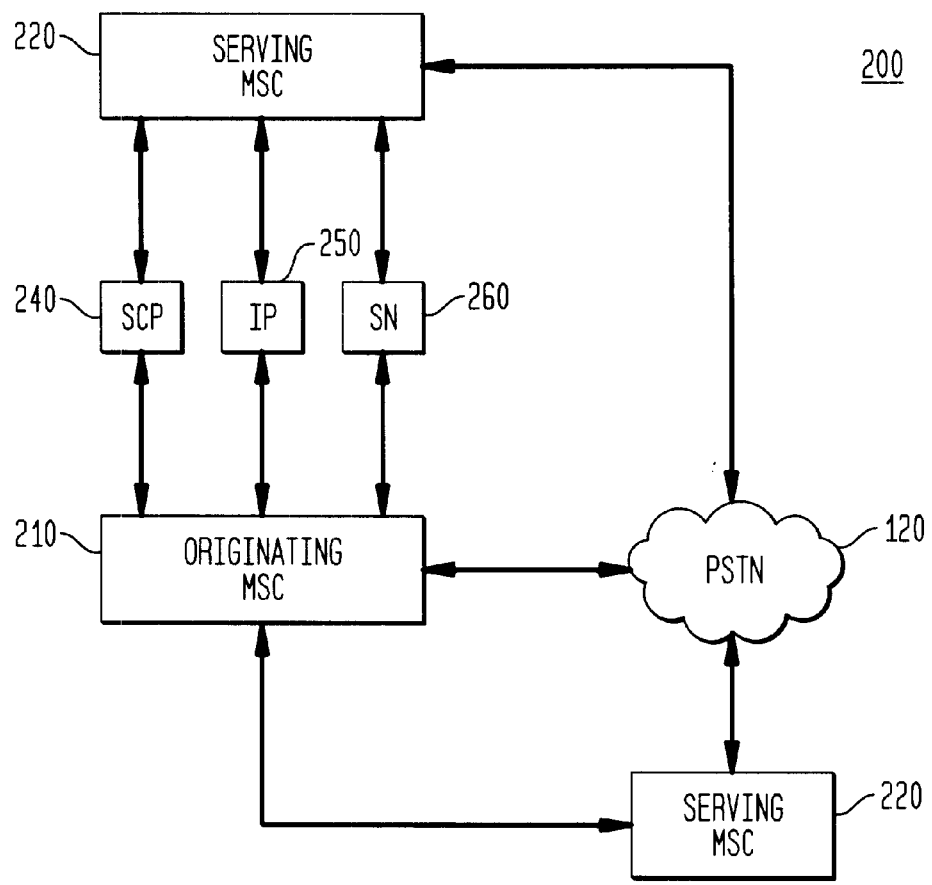
FIG. 2 is a block diagram illustrating a system embodiment in accordance with the present invention.

FIG. 2 is a block diagram illustrating a network 200 having various system embodiments of the present invention. In the preferred embodiment, the system of the present invention is contained or included within a mobile (or wireless) switching center ("MSC") 210 or 220, or within a mobile switching center and an adjunct network entity 110, such as within any of the switching centers 210 or 220 and any of the adjunct network entities SCP 240, IP 250, SN 260, and/or another switching center (210, 220). For example, the system of the present invention may be included or embodied within a switch such as an originating MSC 210, a serving mobile switching center 220, or various combinations of any of the various switching centers 210 or 220, when such switching centers contain or integrate the intelligent network functionality otherwise separately distributed within an adjunct network entity 110. When such intelligent network functionality is so distributed between a switching center 210 or 220 and an adjunct network entity 110, the system of the present invention is preferably embodied within the various switching centers 210 or 220 in further combination with any of the various other adjunct network entities 110, such as SCP 240, IP 250, SN 260, or other switches such as MSCs 210 or 220.

The various adjunct network entities 110 of the network 200, as illustrated in FIG. 2, include a SCP 240, IP 250 and a SN 260. In the preferred embodiment, a service control point (SCP) 240 is a real-time database and transaction processing system that provides service control and service data functionality. An intelligent peripheral (IP) 250 performs specialized resource functions, such as playing announcements, collecting digits, performing speech-to-text or text-to-speech conversion, recording and storing voice messages, facsimile services, data services and so on. The service node (SN) 260 typically combines the capabilities of an IP 250 and a SCP 240 in a single network entity. It provides service logic processing and call termination for specialized resource functions in order to support circuit-related services. From the reference point of an originating MSC 210 (or serving MSC 220), however, any and all of the SCP 240, the IP 250, the SN 260, and the other mobile switching centers (210 or 220), may all be considered to be adjunct network entities 110, as discussed above, in accordance with the present invention.

Continuing to refer to FIG. 2, for example, the originating MSC 210 may receive an incoming call leg that involves an intelligent network service that is to be performed by the service node 260. An origination request within the incoming call leg may direct the originating MSC 210 to invoke the processing capability of the service anode 260, as discussed above. In turn, in the preferred embodiment, the service node 260 then transmits a control message back to the originating MSC 210, in which the control message includes information enabling the SN 260 to retain control over the call (or other communication session) without ongoing monitoring of the session and without maintaining a direct connection or other link (such as a hairpin of loop connection) with the communication session. The control message may contain a variety of independent directives, alone or in combination with other directives.

For example, the control message from the SN 260 to the MSC 210 may have a redirection directive, directing the MSC 210 to reroute the call to designated digits. The control message may include an announcement directive, directing that a specified announcement be played before or during the call. The control message may include an action directive, directing that an action be undertaken, such as attaching additional call legs or releasing the call. In accordance with the control message, the originating mobile switching center 210 may then route or hunk the incoming call to the designated digits of the redirection directive, which may be through a PSTN 120 or a serving MSC 220. Independently of that redirection, such as in lieu of a redirection or during a redirection, the various other intelligent features and activities discussed above may also occur, such as the playing of an announcement (announcement directive) or the release of the telecommunication session (action directive).

Figure 3:
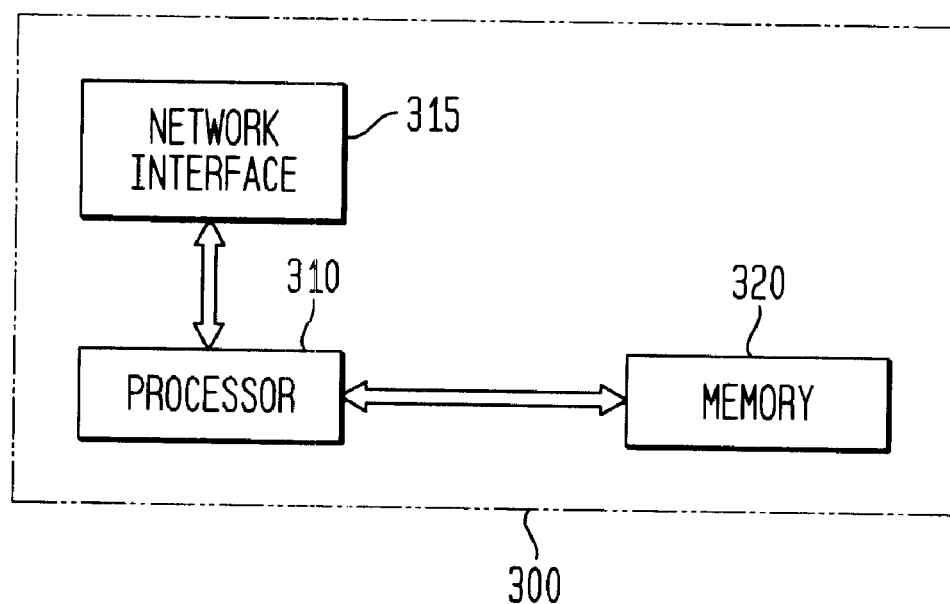
FIG. 3 is a block diagram illustrating an apparatus embodiment in accordance with the present invention.

FIG. 3 is a block diagram illustrating an apparatus embodiment 300 in accordance with the present invention. As discussed in greater detail below, such an apparatus 300 may be included within, or distributed among, an MSC (210 or 220) of the network 200. Alternatively, the apparatus 300 may be included within, or distributed among, any of the switching centers 210 or 220, and an adjunct network entity 110, such as a SCP 240, an IP 250 or a SN 260, of the network 200.

Referring to FIG. 3, the apparatus 300 includes a processor 310, a network interface 315, and a memory 320. The network interface 315 is utilized to receive an incoming call leg, and to transmit an outgoing call leg, for example, to dialed digits or to the digits associated with a redirection directive. For example, in the network 200, the network interface 315 may be couplable to the PSIN 120 for transmission and reception of PSTN (wireline) calls and/or couplable to a wireless transceiver for transmission and reception of wireless calls. The memory 320 may be a magnetic hard drive, an optical storage device, or any other type of data storage apparatus. The memory 320 is used, in the preferred embodiment, to store program instructions as discussed below. In addition, the memory 320 may also store information pertaining to types of service and subscriber classes, and other call placement and routing information.

Continuing to refer to FIG. 3, the processor 310 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components. As a consequence, as used herein, the term processor should be understood to equivalently mean and include a single processor, or arrangement of processors, microprocessors, controllers or some other grouping of integrated circuits which perform the functions discussed above and also discussed in detail below with reference to FIGS. 4 and 5, with associated memory, such as microprocessor memory or additional RAM, ROM, EPROM or E$^2$PROM. The methodology of the invention, as discussed above with reference to FIGS. 1 and 2, and as discussed below with reference to FIGS. 4 and 5, may be programmed and stored, in the processor 310 with its associated memory (or memory 320) and other equivalent components, as a set of program instructions for subsequent execution when the processor 310 is operative (i.e., powered on and functioning).

Figure 4:
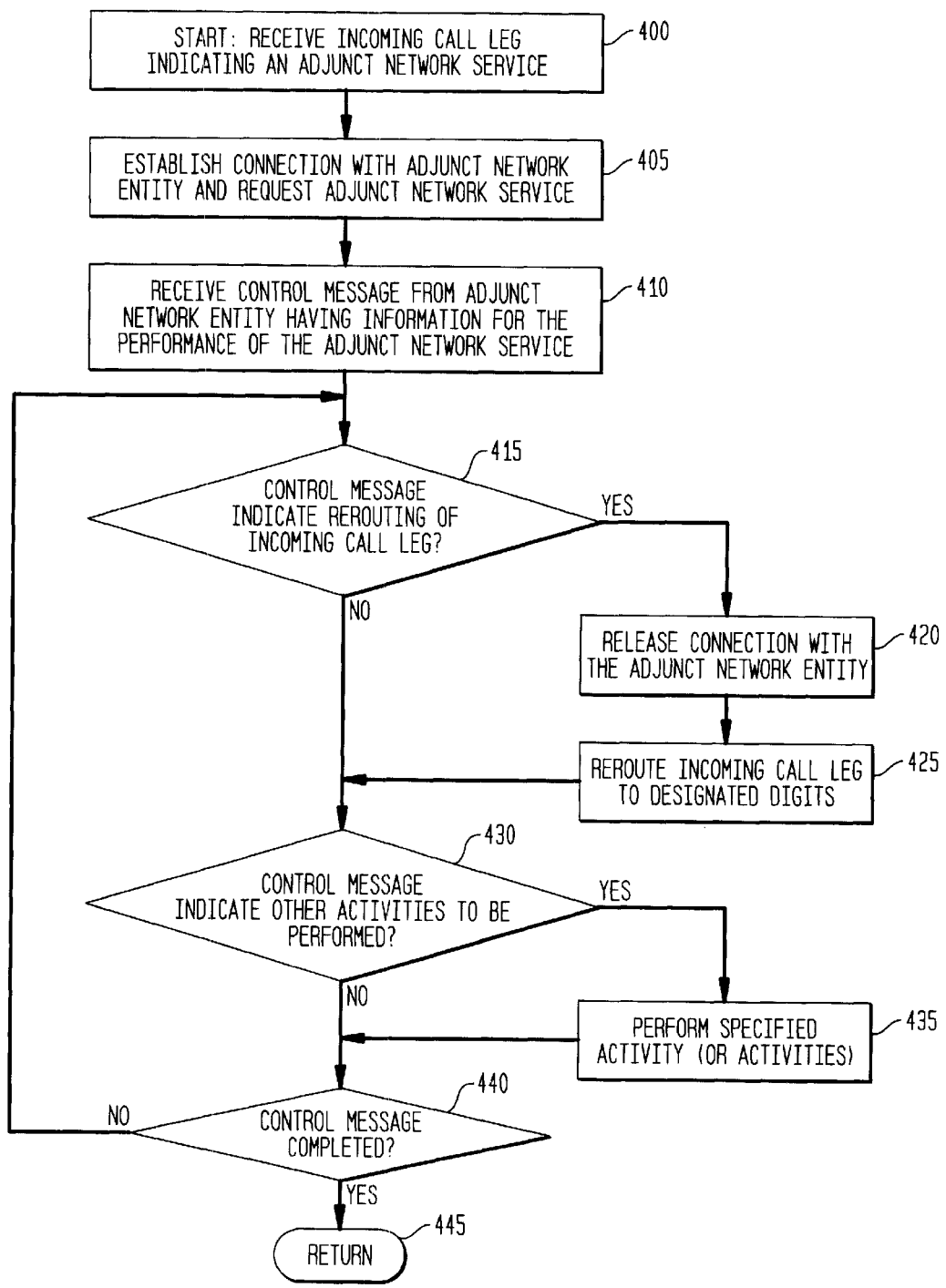
FIG. 4 is a flow diagram illustrating a method embodiment in accordance with the present invention.

FIG. 4 is a flow diagram illustrating a method embodiment in accordance with the present invention. Beginning with start step 400, the method begins with the reception of an incoming call leg indicating that an adjunct network service should be performed. For example, the incoming call leg may indicate or request an adjunct network service such as voice activated dialing, prepaid calling card, or password or PIN verification. When a switch 100 (such as a mobile switching center 210 or 220) receives such an incoming call leg in step 400, the method then establishes a connection or communication session, such as over a trunk, with an adjunct network entity, with a message requesting this adjunct network service. Depending upon the type of service, such a connection may be a direct connection such as a voice path, for services such as voice activated dialing, or may be merely a packet-based connection which does not require that a circuit connection be continuously maintained.

Next, in step 410, a control message from the adjunct network entity is received by the switch, with the control message containing information, such as directives, pertinent to the current or subsequent performance of the requested adjunct network service. In step 415, the method determines whether the control message includes a redirection directive indicating further routing or rerouting of the incoming call leg, such as to designated digits provided for a voice activated dialing service. When in step 415 the control message indicates such routing of the incoming call leg, the method proceeds to release or terminate the connection with the adjunct network entity (such as a circuit-based voice path connection), step 420, and routes the incoming call to the designated digits, step 425. As discussed above, termination/release step 420 eliminates the loop or hairpin connection of the prior art.

Following steps 415 and 425, in step 430, the method determines whether the control message indicates that other or additional activities are to be performed, such as playing a mid-call announcement, releasing the call, attaching additional call legs, or performing any other type of network activity. When in step 430 the control message indicates that any such activities are to be performed, the method proceeds to step 435 and performs those specified activities, such as playing a mid-call announcement or releasing the call.

Following step 435, the method determines whether the control message has been completed, namely, whether all activities and/or routing specified in the control message have been performed, step 440. When the control message has not been completely performed in step 440, the method returns to step 415, to perform the other specified activities. When the control message has been completed in step 440, the method may end, return step 445.

Figure 5:
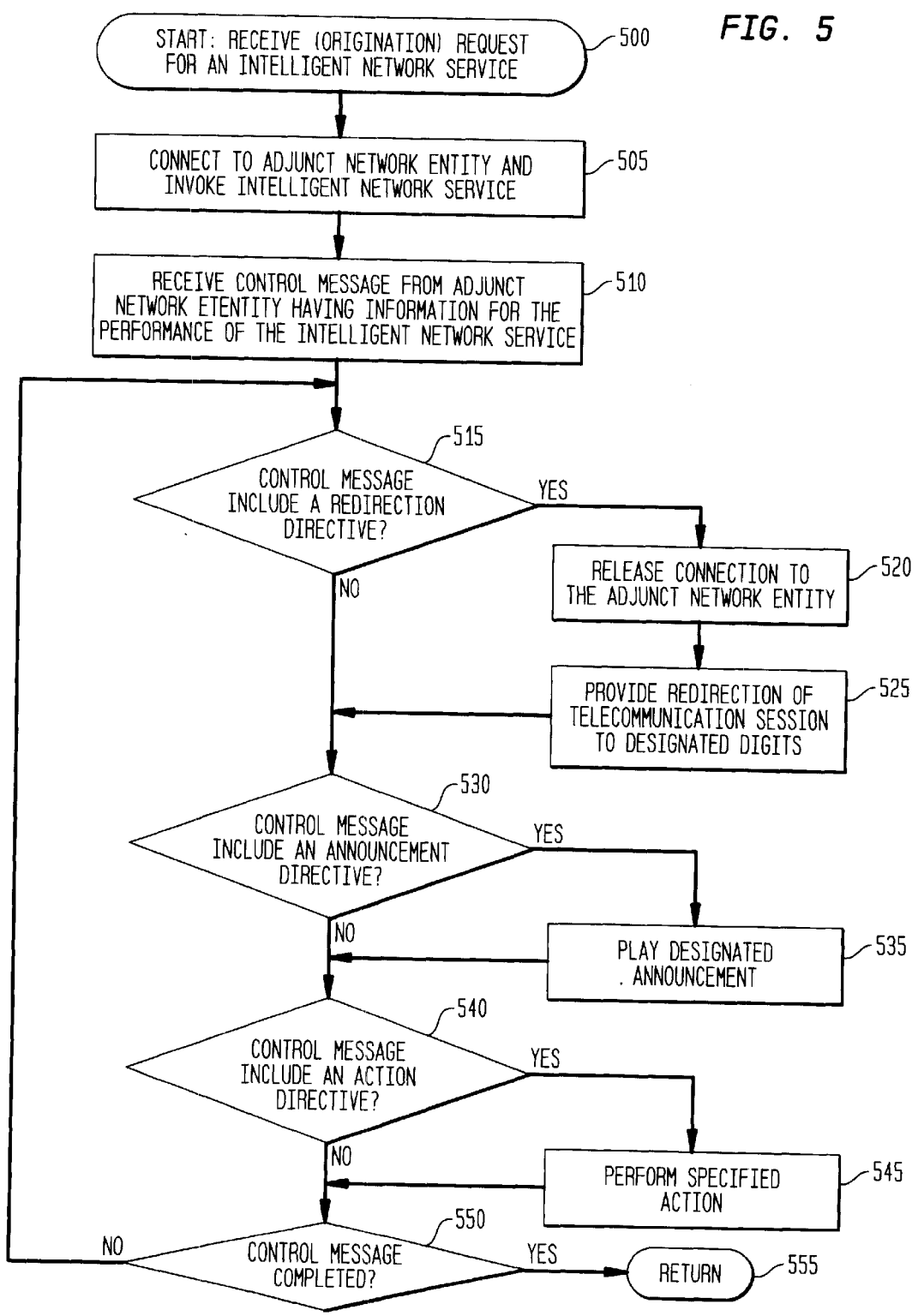
FIG. 5 is a flow diagram illustrating a preferred method embodiment in accordance with the present invention.

FIG. 5 is a flow diagram illustrating a preferred method embodiment in accordance with the present invention. The method begins, start step 500, with the reception of an origination request or other message requesting an intelligent network service. For example, this may be the reception of an incoming call by an originating MSC 210, in which the incoming call is to be provided with a particular class of service requiring intelligent network services. Next, in step 505, the intelligent network services are invoked, for example, such voice activated dialing or password verification. Step 505 is preferably accomplished by a transmission of a message from a switch 100, such as an MSC (210 or 220), to an adjunct network entity 110, such as a serving MSC 220, an SCP 240, and IP 250, or an SN 260. In the preferred wireless embodiment, such a message is an ANSI-41 compatible message initiated with a TCAP INVOKE (LAST) carried in a TCAP QUERY WITH PERMISSION package, encoded utilizing ANSI-41 compatible parameters to specify the requested intelligent network service, such as RedirectionDirective INVOKE Parameters for a redirection. Next, in step 510, a control message is transmitted, preferably from an adjunct network entity 110, to a switch 100, providing activity information pertaining to the requested network service. As mentioned above, in the preferred embodiment, for backwards or retroactive compatibility with other systems, this control message from the adjunct network entity 110 has the general format (or packaging) of an ANSI-41 RedirectionDirective. The control message of the present invention, however, is not an ANSI-41 RedirectionDirective.

For example, the ANSI-41 RedirectionDirective does not provide for the ongoing call control by an adjunct network entity 110 as contemplated by the present invention. In addition, the ANSI-41 RedirectionDirective does not have any provision for inclusion of other intelligent network services, as performance directives, in addition to or in lieu of a redirection of a call. The ANSI-41 RedirectionDirective also does not provide for performing such additional activities before or during a communication session, such as playing a mid-call announcement to the subscriber without redirecting the call. The ANSI-41 RedirectionDirective also does not provide for performance of such activities either concurrently with or subsequent to the performance of a redirection, or independently of a redirection. As a consequence, while the control message from the adjunct network entity has the general format or packaging of an ANSI-41 RedirectionDirective in the preferred embodiment, the control message of the present invention is not an ANSI-41 RedirectionDirective.

Rather, the control message of the present invention is much broader in scope, effect, timing and purpose, and provides for additional functionality wholly independent of the ANSI-41 specification. The control message of the present invention may include directives for any activity independently of any other activity, and may also provide for their independent performance at various or varying times. For example, the control message may include an announcement directive, or an action directive, or any other desired intelligent network service or feature, independently of an inclusion (or non-inclusion) of a redirection directive. In the preferred wireless embodiment, these various other intelligent network services may be encoded as directives utilizing existing ANSI-41 compatible commands or specifications or utilizing entirely new commands and specifications. For example, an announcement directive may be encoded utilizing an ANSI-41 compatible announcement code (ANNCODE), an action directive may be encoded utilizing an ANSI-41 compatible action code (ACTCODE), and a redirection directive may be encoded utilizing an ANSI-41 compatible RedirectionDirective (REDDIR) operation. Other or new intelligent features, however, may require additional or new encoding specifications, independent of or to be subsequently included within an ANSI standard.

Continuing to refer to FIG. 5, following reception of such a control message in step 510, the method then determines whether the control message includes a redirection directive, step 515. When the message includes a redirection directive in step 515, the method proceeds to step 520 and drops or releases the direct connection or link between the switch and the adjunct network entity. Next, the method then provides such redirection of the telecommunication session to the designated digits, step 525. Next, when the message does not include a redirection directive, or following step 525, the method proceeds to step 530 and determines whether the control message includes an announcement directive, such as an announcement code compatible with ANSI-41. When in step 530 the control message includes an announcement directive, in step 535 the selected or designated announcement is played, preferably by a switch 100. Following step 535, or when the control message does not include an announcement directive in step 530, the message proceeds to step 540, and determines whether the control message includes an action directive, such as an action code to release or terminate the communication session or to attach additional call legs, step 540. When in step 540 the message includes an action directive, the method then performs the designated action, such as releasing or terminating the communication session or attaching additional call legs, step 545. Following steps 540 and 545, the method then determines whether the message session has been completed, step 550. For example, the message may include additional announcement codes for the playing of more than one announcement, and in that event, the message returns to step 515, then proceeding to steps 530 and 535 to play the next designated announcement. When the message session has been completed in step 550, the method may end, return step 555.

Numerous advantages of the present invention are readily apparent. First, the apparatus, method and system of the present invention provide for ongoing control of a telecommunication session by an adjunct network entity over a wide variety of intelligent network services, utilizing a control message having various directives for current or subsequent execution or implementation by a switching center. Such control may be before or during a communication session. In addition, such activities may be performed during or after routing or rerouting of a call, for example, for routing of calls of voice activated dialing services.

In addition, the apparatus, method and system of the present invention implement and maintain telecommunication session or call control by an adjunct network entity, such as by a service control point, a service node, an intelligent peripheral, or an additional switch, without also maintaining an ongoing or direct connection, such as a loop or hairpin connection, with the adjunct network entity. As a consequence, the apparatus, method and system of the present invention provide for a much more efficient use of network resources. The apparatus, method and system of the present invention are also user friendly, user transparent, and dynamic and responsive to changing environmental and user conditions that may arise in wireless communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method of telecommunication session control by an adjunct network entity, the method comprising:
    (a) receiving an incoming call leg at a switching center indicating an adjunct network service;
    (b) while maintaining at least a portion of the incoming call leg at the switching center, requesting the adjunct network service from the adjunct network entity, the adjunct network entity separate from the switching center;
    (c) receiving a control message from the adjunct network entity;
    (d) when the control message includes a redirection directive, the switching center releasing a direct connection with the adjunct network entity and routing the incoming call leg to designated digits of the control message; and
    (e) when the control message includes a performance directive, performing an activity designated in the control message.

2. The method of claim 1, wherein step (e) further comprises:
    when the control message includes an action directive, performing an action designated in the control message.

3. The method of claim 2, wherein the action directive is encoded by an ANSI-41 compatible ActionCode.

4. The method of claim 2, wherein the action directive is a release of the telecommunication session.

5. The method of claim 2, wherein the action directive is an attachment of an additional call leg to the telecommunication session.

6. The method of claim 2, wherein the action directive is a continuation of processing of the telecommunication session.

7. The method of claim 1, wherein step (e) further comprises:
    when the control message includes an announcement directive, providing an announcement designated in the control message.

8. The method of claim 7, wherein the announcement directive is encoded by an ANSI-41 compatible AnnouncementCode.

9. The method of claim 7, wherein the announcement directive is a mid-call announcement.

10. The method of claim 1, wherein the redirection directive is encoded by an ANSI-41 compatible RedirectionDirective.

11. The method of claim 1, wherein the control message has a format of an ANSI-41 compatible RedirectionDirective.

12. The method of claim 1, wherein the activity is to be performed during the telecommunication session.

13. The method of claim 1, wherein the activity is to be performed prior to the telecommunication session.

14. The method of claim 1, wherein the activity directive is independent of the redirection directive.

15. The method of claim 1, wherein the activity is to be performed independently of the routing of the incoming call leg to designated digits of the control message.

16. A system for wireless telecommunication session control by an adjunct network entity, the system comprising:
    an adjunct network entity, wherein the adjunct network entity, when operative, includes program instructions to generate a control message in response to a request for an adjunct network service; and
    a mobile switching center separate from and coupled to the adjunct network entity, wherein the mobile switching center, when operative, includes program instructions to receive an incoming call leg indicating an adjunct network service, to maintain at least a portion of the incoming call leg at the mobile switching center, to request the adjunct network service from the adjunct network entity and to receive the control message from the adjunct network entity; the mobile switching center including further program instructions, when the control message includes a redirection directive, to route the incoming call leg to designated digits of the control message and to release a direct connection with the adjunct network entity; and the mobile switching center including further program instructions, when the control message includes a performance directive, to perform an activity designated in the control message.

17. The system of claim 16 wherein the mobile switching center includes further program instructions, when the control message includes an action directive, to perform an action designated in the control message.

18. The system of claim 17, wherein the action directive is encoded by an ANSI-41 compatible ActionCode.

19. The system of claim 17, wherein the action directive is a release of the telecommunication session.

20. The system of claim 17, wherein the action directive is a release of the telecommunication session.

21. The system of claim 17, wherein the action directive is a continuation of processing of the telecommunication session.

22. The system of claim 16 wherein the mobile switching center includes further program instructions, when the control message includes an announcement directive, to provide an announcement designated in the control message.

23. The system of claim 22, wherein the announcement directive is encoded by an ANSI-41 compatible AnnouncementCode.

24. The system of claim 22, wherein the announcement directive is a mid-call announcement.

25. The system of claim 16, wherein the redirection directive is encoded by an ANSI-41 compatible RedirectionDirective.

26. The system of claim 16, wherein the control message has a format of an ANSI-41 compatible RedirectionDirective.

27. The system of claim 16 wherein the adjunct network entity is a service node.

28. The system of claim 16 wherein the adjunct network entity is a service control point.

29. The system of claim 16 wherein the adjunct network entity is an intelligent peripheral.

30. The system of claim 16 wherein the adjunct network entity is a serving mobile switching center.

31. The system of claim 16 wherein the mobile switching center is an originating mobile switching center.

32. The system of claim 16 wherein the mobile switching center is a terminating mobile switching center.

33. The system of claim 16 wherein the adjunct network entity is incorporated into the mobile switching center.

34. The system of claim 16, wherein the activity is to be performed during the telecommunication session.

35. The system of claim 16, wherein the activity is to be performed prior to the telecommunication session.

36. The system of claim 16, wherein the activity directive is independent of the redirection directive.

37. The system of claim 16, wherein the activity is to be performed independently of the routing of the incoming call leg to designated digits of the control message.

38. An apparatus for telecommunication session control by an adjunct network entity, the apparatus included within a switching center separate from and coupleable to the adjunct network entity, the apparatus comprising:
   a network interface, the network interface to receive an incoming call leg indicating an adjunct network service, to transmit a request to the adjunct network entity, and to receive a control message from the adjunct network entity;
   a memory; and
   a processor coupled to the network interface and to the memory, wherein the processor, when operative, includes program instructions to maintain at least a portion of the incoming call leg at the switching center, to request the adjunct network service from the adjunct network entity; following reception of the control message, the processor including further program instructions, when the control message includes a redirection directive, to route the incoming call leg to designated digits of the control message and to release a direct connection with the adjunct network entity; and when the control message includes a performance directive, the processor including further program instructions to perform an activity designated in the control message.

39. The apparatus of claim 38 wherein the processor includes further program instructions, when the control message includes an action directive, to perform an action designated in the control message.

40. The apparatus of claim 39, wherein the action directive is encoded by an ANSI-41 compatible ActionCode.

41. The apparatus of claim 39, wherein the action directive is a release of the telecommunication session.

42. The apparatus of claim 39, wherein the action directive is an attachment of an additional call leg to the telecommunication session.

43. The apparatus of claim 39, wherein the action directive is a continuation of processing of the telecommunication session.

44. The apparatus of claim 38 wherein the processor includes further program instructions, when the control message includes an announcement directive, to provide an announcement designated in the control message.

45. The apparatus of claim 44, wherein the announcement directive is encoded by an ANSI-41 compatible AnnouncementCode.

46. The apparatus of claim 44, wherein the announcement directive is a mid-call announcement.

47. The apparatus of claim 38, wherein the redirection directive is encoded by an ANSI-41 compatible RedirectionDirective.

48. The apparatus of claim 38, wherein the control message has a format of an ANSI-41 compatible RedirectionDirective.

49. The apparatus of claim 38, wherein the activity is to be performed during the telecommunication session.

50. The apparatus of claim 38, wherein the activity is to be performed prior to the telecommunication session.

51. The apparatus of claim 38, wherein the activity directive is independent of the redirection directive.

52. The apparatus of claim 38, wherein the activity is to be performed independently of the routing of the incoming call leg to designated digits of the control message.

* * * * *